US009860879B2

(12) United States Patent
Riegel

(10) Patent No.: US 9,860,879 B2
(45) Date of Patent: Jan. 2, 2018

(54) VIRTUAL RADIO NETWORKS

(75) Inventor: Maximilian Riegel, Nürnberg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 257 days.

(21) Appl. No.: 13/883,588

(22) PCT Filed: Nov. 4, 2010

(86) PCT No.: PCT/EP2010/066824
§ 371 (c)(1),
(2), (4) Date: Jul. 22, 2013

(87) PCT Pub. No.: WO2012/059130
PCT Pub. Date: May 10, 2012

(65) Prior Publication Data
US 2013/0308565 A1 Nov. 21, 2013

(51) Int. Cl.
H04W 72/04 (2009.01)
H04W 76/02 (2009.01)
(Continued)

(52) U.S. Cl.
CPC ..... *H04W 72/0413* (2013.01); *H04W 76/025* (2013.01); *H04L 41/0803* (2013.01); *H04W 88/06* (2013.01)

(58) Field of Classification Search
CPC .................................................. H04L 1/0803
(Continued)

(56) References Cited

U.S. PATENT DOCUMENTS

2002/0022483 A1* 2/2002 Thompson .......... H04L 12/1464
455/439
2005/0261970 A1* 11/2005 Vucina et al. .................. 705/16
(Continued)

FOREIGN PATENT DOCUMENTS

WO WO 2005/112598 A1 12/2005

OTHER PUBLICATIONS

DSLHome—Technical Working Group, DSLHome Internet Gateway Device Version 1.1 Data Model for Tr-069, Sep. 2005, DSL Forum, Version 1.1, pp. 84-96.*
(Continued)

*Primary Examiner* — Jeffrey M Rutkowski
*Assistant Examiner* — Thomas D Busch
(74) *Attorney, Agent, or Firm* — Squire Patton Boggs (US) LLP

(57) ABSTRACT

It is provided an apparatus, comprising radio side separating means for separating first uplink data of a first radio network received from a physical radio interface from second uplink data of a second radio network received from the physical radio interface; first uplink processing means configured to process, according to a higher layer uplink functionality, the first uplink data into first processed uplink data; second uplink processing means configured to process, according to the higher layer uplink functionality, the second uplink data into second processed uplink data; and aggregating means for providing the first processed uplink data to a first logical channel of a physical transport means and the second processed uplink data to a second logical channel of the physical transport means, wherein the first radio network is different from the second radio network; and the first logical channel is different from the second logical channel.

29 Claims, 6 Drawing Sheets

(51) Int. Cl.
*H04L 12/24* (2006.01)
*H04W 88/06* (2009.01)

(58) Field of Classification Search
USPC .................................................. 370/329, 339
See application file for complete search history.

(56) References Cited

U.S. PATENT DOCUMENTS

2011/0013608 A1* 1/2011 Lee et al. ...................... 370/338
2012/0044914 A1* 2/2012 Chen .................... H04W 84/02
370/338

OTHER PUBLICATIONS

International Search Report and Written Opinion dated Aug. 25, 2011 corresponding to International Patent Application No. PCT/EP2010/066824.
Bernard Aroba, "Virtual Access Points," IEEE P802.11 Wireless Lans, No. 802.11-03/154rl, May 22, 2003, pp. 1-13, XP002425027.
WiFi Network Related Settings, by Nokia Solutions and Networks, dated Dec. 21, 2009.
WiFi AP Preconfiguration, by Nokia Solutions and Networks, dated Dec. 21, 2009.
3GPP TS 24.312 V8.1.0 (Mar. 2009); 3rd Generation Partnership Project; Technical Specification Group Core Network and Terminals; Access Network Discovery and Selection Function (ANDSF) Management Object (MO); (Release 8); 82 pages.
TR-069; Wikipedia; https://web.archive.org/web/20090210081829/https:/en.wikipedia.org/wiki/TR-069, Feb. 10, 2009.
3GPP TS 23.402 V8.0.0 (Dec. 2007); 3rd Generation Partnership Project; Technical Specification Group Services and System Aspects; Architecture enhancements for non-3GPP accesses; (Release 8); 131 pages.
3GPP TS 23.402 V9.0.0 (Mar. 2009); 3rd Generation Partnership Project; Technical Specification Group Services and System Aspects; Architecture enhancements for non-3GPP accesses; (Release 9); 191 pages.
WiFi Protected Setup (WPS), by Nokia Solutions and Networks, dated Dec. 21, 2009.
Access Network Discovery and Selection Function (ANDSF), by Nokia Solutions and Networks, dated Dec. 21, 2009.
TR-069 Management, Technology Brief for Service Providers; https://web.archive.org/web/20091219185324/http:/www.works-sys.com/tr069briefhtml, Dec. 19, 2009.
Bernstein, et al., "Technical Report", DSL Forum TR-098, DSLHOME, Internet Gateway Device, Version 1.1, Data Model for TR-069, Sep. 2005, https://www.broadband-forum.org/technical/download/TR-098.pdf, 96 pages, retrieved on Aug. 7, 2017.
HGI (Home Gateway Initiative), by Nokia Solutions and Networks, dated Dec. 21, 2009.
FON, by Nokia Solutions and Networks, dated Dec. 21, 2009.
FON; https://web.archive.org/web/20091219123811/http:/www.fon.com/en/; Dec. 19, 2009.

* cited by examiner

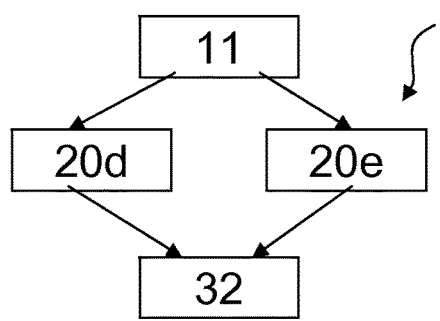
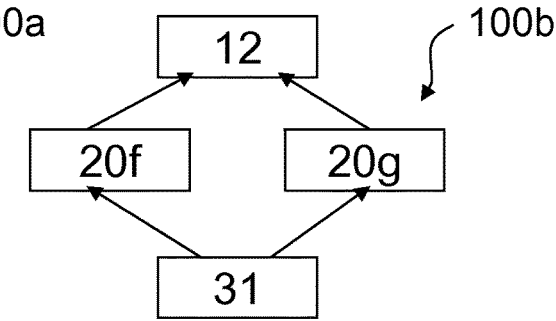
Fig. 2a     Fig. 2b
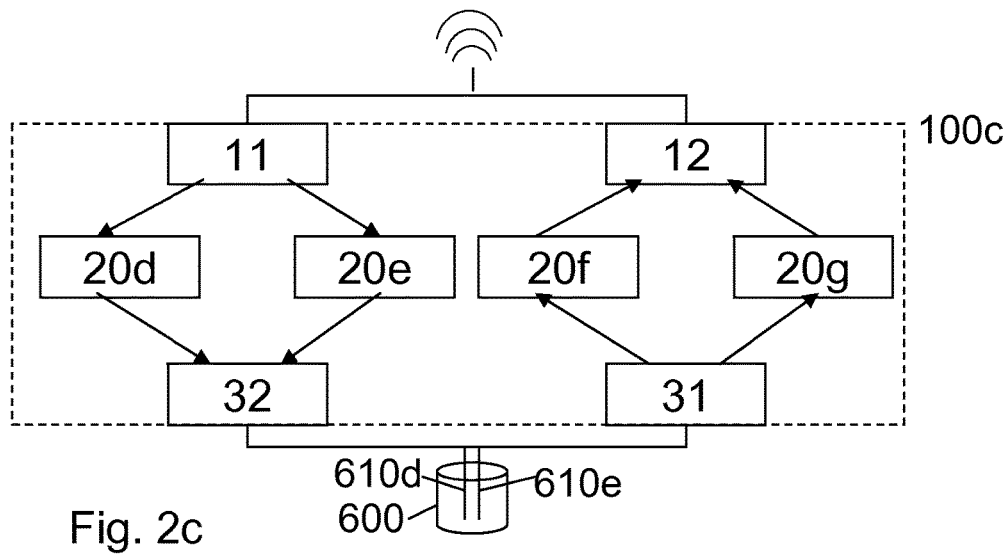
Fig. 2c
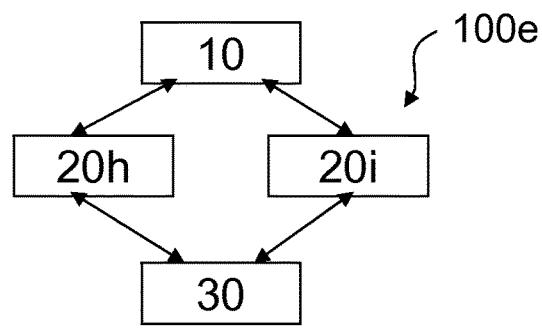
Fig. 2d

VIRTUAL RADIO NETWORKS

FIELD OF THE INVENTION

The present invention relates to an apparatus, a method, a system, and a computer program product related to a virtual radio network. More particularly, the present invention relates to an apparatus, a method, a system, and a computer program product for an access point for virtual radio networks and its configuration management.

BACKGROUND OF THE INVENTION

Mobile network operators would like to offer controlled wireless access based on WLAN/IEEE802.11 technology to establish a secondary wireless access to increase capacity and coverage of their mobile networks in a cost efficient way. A corresponding solution may also be used by broadband or wireless fidelity (WiFi) operators to establish public WiFi access.

A main problem of establishing operator controlled WiFi access (access that can be used by other customers of the operator than the site owner) is the cost for establishing and operating the infrastructure, i.e. installing WiFi access points (APs), connecting the APs to the back end system and providing the power source for the WiFi APs.

Cost reduction is possible by sharing the infrastructure with other users. When sharing infrastructure with multiple site owners the scalability of the solution becomes a huge issue because individual agreements with thousands/millions of partners are a huge effort and may cause many complications, as site owners usually follow their own requirements. So far, such infrastructure sharing was only commercially feasible with huge cooperations running their enterprise networks in some uniform way.

Since there is no real alternative solution, operators are relying so far on own installations (expensive) or on mutual agreements with the site owners to leverage the installations of the site owners requiring comprehensive technical agreements to allow secondary usage.

Sometimes, site owners hesitate to allow a secondary usage of their infrastructure because of concerns with respect to security or flexibility to configure their network according to their own needs.

SUMMARY OF THE INVENTION

It is an object of the present invention to improve the prior art.

According to a first aspect of the invention, there is provided an apparatus, comprising a radio side separating means for separating first uplink data of a first radio network received from a physical radio interface from second uplink data of a second radio network received from the physical radio interface; a first uplink processing means configured to process, according to a layer 3 and/or higher layer uplink functionality, the first uplink data into first processed uplink data; a second uplink processing means configured to process, according to the layer 3 and/or higher layer uplink functionality, the second uplink data into second processed uplink data; and a provider side aggregating means for providing the first processed uplink data to a first logical channel of a physical transport means and the second processed uplink data to a second logical channel of the physical transport means, wherein the first radio network is different from the second radio network; and the first logical channel is different from the second logical channel.

According to a second aspect of the invention, there is provided an apparatus, comprising a provider side separating means for separating first downlink data for a first radio network received from a first logical channel of a physical transport means from second downlink data for a second radio network received from a second logical channel of the physical transport means; a first downlink processing means configured to process, according to a layer 3 and/or higher layer downlink functionality, the first downlink data into first processed downlink data; a second downlink processing means configured to process, according to the layer 3 and/or higher layer downlink functionality, the second downlink data into second processed downlink data; and a radio side aggregating means for aggregating the first processed downlink data and the second processed downlink data to a physical radio interface, wherein the first radio network is different from the second radio network; and the first logical channel is different from the second logical channel.

The apparatus according to the first aspect may further comprise a provider side separating means for separating first downlink data for the first radio network received from the first logical channel from second downlink data for the second radio network received from the second logical channel; a first downlink processing means configured to process, according to a layer 3 and/or higher layer downlink functionality, the first downlink data into first processed downlink data; a second downlink processing means configured to process, according to the layer 3 and/or higher layer downlink functionality, the second downlink data into second processed downlink data; and a radio side aggregating means for aggregating the first processed downlink data and the second processed downlink data to the physical radio interface, thus being an apparatus of the second aspect, too.

The apparatus according to the first or second aspect may further comprise an access control means for controlling a usage of each of the first and second radio networks by a user device.

In the apparatus according to the first or second aspect at least one of the layer 3 or higher layer uplink functionality and the layer 3 or higher layer downlink functionality may be network address translation, firewalling, filtering, virtual private network tunneling, and/or traffic shaping.

In the apparatus according to the first aspect, the first uplink processing means may be configurable independent from the second uplink processing means, and/or, in the apparatus according to the second aspect, the first downlink processing means may be configurable independent from the second downlink processing means.

The apparatus according to the first or second aspect may further comprise communication means for communicating at least one of a first processing parameter and a second processing parameter with a configuration device; wherein, in an apparatus according to the first aspect, the first and second uplink processing means may be configured to process based on the first and second processing parameter, respectively, and/or, in an apparatus according to the second aspect, the first and second downlink processing means may be configured to process based on the first and second processing parameter, respectively.

The apparatus according to the first or second aspect may further comprise a resource control means configured to manage radio resources associated with each of the first and second radio networks according to a first radio configuration parameter and a second radio configuration parameter, respectively, wherein the communication means may be additionally adapted to communicate at least one of the first and second radio configuration parameters.

According to a third aspect of the invention, there is provided an apparatus, comprising a radio side separating processor for separating first uplink data of a first radio network received from a physical radio interface from second uplink data of a second radio network received from the physical radio interface; a first uplink processing processor configured to process, according to a layer 3 and/or higher layer uplink functionality, the first uplink data into first processed uplink data; a second uplink processing processor configured to process, according to the layer 3 and/or higher layer uplink functionality, the second uplink data into second processed uplink data; and a provider side aggregating processor for providing the first processed uplink data to a first logical channel of a physical transport line and the second processed uplink data to a second logical channel of the physical transport line, wherein the first radio network is different from the second radio network; and the first logical channel is different from the second logical channel.

According to a fourth aspect of the invention, there is provided an apparatus, comprising a provider side separating processor for separating first downlink data for a first radio network received from a first logical channel of a physical transport line from second downlink data for a second radio network received from a second logical channel of the physical transport line; a first downlink processing processor configured to process, according to a layer 3 and/or higher layer downlink functionality, the first downlink data into first processed downlink data; a second downlink processing processor configured to process, according to the layer 3 and/or higher layer downlink functionality, the second downlink data into second processed downlink data; and a radio side aggregating processor for aggregating the first processed downlink data and the second processed downlink data to a physical radio interface, wherein the first radio network is different from the second radio network; and the first logical channel is different from the second logical channel.

The apparatus according to the third aspect may further comprise a provider side separating processor for separating first downlink data for the first radio network received from the first logical channel from second downlink data for the second radio network received from the second logical channel; a first downlink processing processor configured to process, according to a layer 3 and/or higher layer downlink functionality, the first downlink data into first processed downlink data; a second downlink processing processor configured to process, according to the layer 3 and/or higher layer downlink functionality, the second downlink data into second processed downlink data; and a radio side aggregating processor for aggregating the first processed downlink data and the second processed downlink data to the physical radio interface, thus being an apparatus of the fourth aspect, too.

The apparatus according to the third or fourth aspect may further comprise an access control processor for controlling a usage of each of the first and second radio networks by a user device.

In the apparatus according to the third or fourth aspect at least one of the layer 3 or higher layer uplink functionality and the layer 3 or higher layer downlink functionality may be network address translation, firewalling, filtering, virtual private network tunneling, and/or traffic shaping.

In the apparatus according to the third aspect, the first uplink processing processor may be configurable independent from the second uplink processing processor, and/or, in the apparatus according to the fourth aspect, the first downlink processing processor may be configurable independent from the second downlink processing processor.

The apparatus according to the third or fourth aspect may further comprise communication processor for communicating at least one of a first processing parameter and a second processing parameter with a configuration device; wherein, in an apparatus according to the third aspect, the first and second uplink processing processor may be configured to process based on the first and second processing parameter, respectively, and/or, in an apparatus according to the fourth aspect, the first and second downlink processing processor may be configured to process based on the first and second processing parameter, respectively.

The apparatus according to the third or fourth aspect may further comprise a resource control processor configured to manage radio resources associated with each of the first and second radio networks according to a first radio configuration parameter and a second radio configuration parameter, respectively, wherein the communication processor may be additionally adapted to communicate at least one of the first and second radio configuration parameters.

According to a fifth aspect of the invention, there is provided a customer premises equipment comprising an apparatus according to any of first to fourth aspects.

According to a sixth aspect of the invention, there is provided an apparatus, comprising storage means for storing a configuration information; wherein the configuration information comprises a first parameter of an access apparatus, wherein the first parameter is a physical radio access parameter of a physical radio access of the access apparatus for a first radio network, a second parameter of the access apparatus for a second radio network different from the first radio network, wherein the second parameter corresponds to the first parameter, a third parameter of the access apparatus of a layer 1 and/or layer 2 functionality of the first radio network; a fourth parameter of the access apparatus of the layer 1 and/or layer 2 functionality of the second radio network, wherein the fourth parameter corresponds to the third parameter; a fifth parameter of the access apparatus of a layer 3 and/or higher layer functionality of the first radio network; and a sixth parameter of the access apparatus of the layer 3 and/or higher layer functionality of the second radio network, wherein the sixth parameter corresponds to the fifth parameter; wherein a value of the first parameter depends on a value of the second parameter; a value of the third parameter does not depend on a value of the fourth parameter; and a value of the fifth parameter does not depend on a value of the sixth parameter.

In the apparatus according to the sixth aspect, the layer 3 and/or higher layer functionality may be network address translation, firewalling, filtering, virtual private network tunneling, and/or traffic shaping.

The apparatus according to the sixth aspect may store more than one fifth parameter for the first radio network and corresponding sixth parameters for the second radio network, wherein a value of each of the fifth parameters does not depend on a value of the corresponding sixth parameter.

According to a seventh aspect of the invention, there is provided an apparatus, comprising a memory for storing a configuration information; wherein the configuration information comprises a first parameter of an access apparatus, wherein the first parameter is a physical radio access parameter of a physical radio access of the access apparatus for a first radio network, a second parameter of the access apparatus for a second radio network different from the first radio network, wherein the second parameter corresponds to the first parameter, a third parameter of the access apparatus of a layer 1 and/or layer 2 functionality of the first radio network; a fourth parameter of the access apparatus of the layer 1 and/or layer 2 functionality of the second radio network, wherein the fourth parameter corresponds to the third parameter; a fifth parameter of the access apparatus of a layer 3 and/or higher layer functionality of the first radio network; and a sixth parameter of the access apparatus of the layer 3 and/or higher layer functionality of the second radio network, wherein the sixth parameter corresponds to the fifth parameter; wherein a value of the first parameter depends on a value of the second parameter; a value of the third parameter does not depend on a value of the fourth parameter; and a value of the fifth parameter does not depend on a value of the sixth parameter.

In the apparatus according to the seventh aspect, the layer 3 and/or higher layer functionality may be network address translation, firewalling, filtering, virtual private network tunneling, and/or traffic shaping.

The apparatus according to the seventh aspect may store more than one fifth parameter for the first radio network and corresponding sixth parameters for the second radio network, wherein a value of each of the fifth parameters does not depend on a value of the corresponding sixth parameter.

According to an eighth aspect of the invention, there is provided a configuration manager, comprising an apparatus according to any of the sixth and seventh aspects.

According to a ninth aspect of the invention, there is provided a system, comprising an access apparatus according to one of the first and second aspects; a configuration apparatus according to the sixth aspect; wherein the configuration apparatus further comprises access communication means for exchanging at least one of the fifth and sixth parameters with the communication means of the access apparatus; the fifth parameter of the configuration apparatus corresponds to the first processing parameter; and the sixth parameter of the configuration apparatus corresponds to the second processing parameter.

In the system, the access communication means may be additionally adapted to exchange one of the first, second, third, and fourth parameters of the configuration apparatus, wherein the first and second radio configuration parameters of the access apparatus correspond to first and second parameters of the configuration apparatus, respectively, or to the third and fourth parameters of the configuration apparatus, respectively.

According to a tenth aspect of the invention, there is provided a system, comprising an access apparatus according to one of the third and fourth aspects; and a configuration apparatus according to the seventh aspect; wherein the configuration apparatus further comprises access communication processor for exchanging at least one of the fifth and sixth parameters with the communication processor of the access apparatus; the fifth parameter of the configuration apparatus corresponds to the first processing parameter; and the sixth parameter of the configuration apparatus corresponds to the second processing parameter.

In the system, the access communication processor may be additionally adapted to exchange one of the first, second, third, and fourth parameters of the configuration apparatus, wherein the first and second radio configuration parameters of the access apparatus correspond to first and second parameters of the configuration apparatus, respectively, or to the third and fourth parameters of the configuration apparatus, respectively.

According to an eleventh aspect of the invention, there is provided a method, comprising separating first uplink data of a first radio network received from a physical radio interface from second uplink data of a second radio network received from the physical radio interface; processing, according to a layer 3 and/or higher layer uplink functionality, the first uplink data into first processed uplink data; processing, according to the layer 3 and/or higher layer uplink functionality, the second uplink data into second processed uplink data; and providing the first processed uplink data to a first logical channel of a physical transport means and the second processed uplink data to a second logical channel of the physical transport means, wherein the first radio network is different from the second radio network; and the first logical channel is different from the second logical channel.

According to a twelfth aspect of the invention, there is provided a method comprising separating first downlink data for a first radio network received from a first logical channel of a physical transport means from second downlink data for a second radio network received from a second logical channel of the physical transport means; processing, according to a layer 3 and/or higher layer downlink functionality, the first downlink data into first processed downlink data; processing, according to the layer 3 and/or higher layer downlink functionality, the second downlink data into second processed downlink data; and aggregating the first processed downlink data and the second processed downlink data to a physical radio interface, wherein the first radio network is different from the second radio network; and the first logical channel is different from the second logical channel.

The method according to the eleventh aspect may further comprise separating first downlink data for the first radio network received from the first logical channel from second downlink data for the second radio network received from the second logical channel; processing, according to a layer 3 and/or higher layer downlink functionality, the first downlink data into first processed downlink data; processing, according to the layer 3 and/or higher layer downlink functionality, the second downlink data into second processed downlink data; and aggregating the first processed downlink data and the second processed downlink data to the physical radio interface, thus being a method of the twelfth aspect, too.

The method according to the eleventh or twelfth aspect may further comprise controlling a usage of each of the first and second radio networks by a user device.

In the method according to the eleventh or twelfth aspect, at least one of the layer 3 or higher layer uplink functionality and the layer 3 or higher layer downlink functionality may be network address translation, firewalling, filtering, virtual private network tunneling, and/or traffic shaping.

In the method according to the eleventh aspect, the processing of the first uplink data may be configurable independent from the processing of the second uplink data, and/or in the method according to the twelfth aspect, the processing of the first downlink data may be configurable independent from the processing of the second downlink data.

The method according to the eleventh or twelfth aspect may further comprise communicating a first and second processing parameter with a configuration device; wherein, in the method of the eleventh aspect, the processing of the first uplink data and the second uplink data may be based on the first and second processing parameter, respectively, and/or, in the method of the twelfth aspect, the processing of the first downlink data and the second downlink data may be based on the first and second processing parameter, respectively.

The method according to the eleventh or twelfth aspect may further comprise communicating a first and second radio configuration parameter; and managing radio resources associated with each of the first and second radio networks according to the first and the second radio configuration parameter, respectively.

The method of the eleventh or twelfth aspect may be a method of a virtual radio network.

According to a thirteenth aspect of the invention, there is provided a method, comprising storing a configuration information; wherein the configuration information comprises a first parameter of an access apparatus, wherein the first parameter is a physical radio access parameter of a physical radio access of the access apparatus for a first radio network, a second parameter of the access apparatus for a second radio network different from the first radio network, wherein the second parameter corresponds to the first parameter, a third parameter of the access apparatus of a layer 1 and/or layer 2 functionality of the first radio network; a fourth parameter of the access apparatus of the layer 1 and/or layer 2 functionality of the second radio network, wherein the fourth parameter corresponds to the third parameter; a fifth parameter of the access apparatus of a layer 3 and/or higher layer functionality of the first radio network; and a sixth parameter of the access apparatus of the layer 3 and/or higher layer functionality of the second radio network, wherein the sixth parameter corresponds to the fifth parameter; wherein a value of the first parameter depends on a value of the second parameter; a value of the third parameter does not depend on a value of the fourth parameter; and a value of the fifth parameter does not depend on a value of the sixth parameter.

In the method according to the thirteenth aspect, the layer 3 and/or higher layer functionality may be network address translation, firewalling, filtering, virtual private network tunneling, and/or traffic shaping.

In the method according to the thirteenth aspect, the storing may comprise storing more than one fifth parameter for the first radio network and corresponding sixth parameters for the second radio network, wherein a value of each of the fifth parameters does not depend on a value of the corresponding sixth parameter.

The method according to the thirteenth aspect may be a method of configuration management.

According to a fourteenth aspect of the invention, there is provided a computer program product comprising computer-executable components which perform, when the program is run on a computer, the execution which results in operations of the method according to any of the eleventh to thirteenth aspects.

The computer program product may be embodied as a computer-readable storage medium.

Thus, it is provided a way to improve the flexibility of configuring a virtual radio access, to improve the security of the system, to enhance the functionality for each virtual radio access point of a single physical radio access point, and to avoid physical work at remote sites where radio access points are located.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein

FIGS. 2a to 2d show access apparatuses according to embodiments of the invention;

DETAILED DESCRIPTION OF CERTAIN EMBODIMENTS

Figures 1, 3, 4:
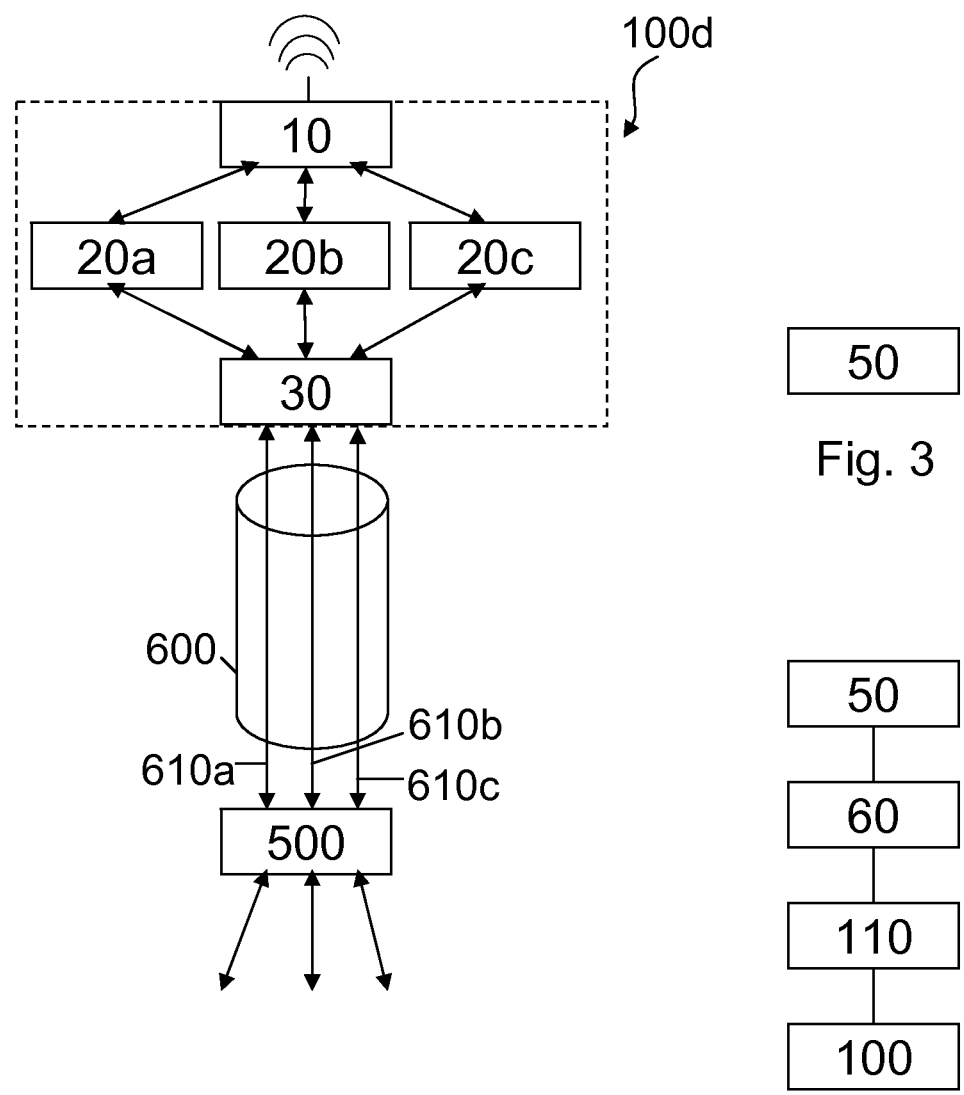
FIG. 1 shows a system employing an access apparatus according to an embodiment of the invention.
FIG. 3 shows a configuration manager according to an embodiment of the invention.
FIG. 4 shows a system according to an embodiment of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

According to some embodiments of the invention, a couple of advanced technologies are combined in a unique way to enable operators to create a 'virtual' WiFi radio access network on top of the existing wireline broadband access infrastructure (digital subscriber line (DSL) Networks, Cable Networks), which today commonly deploys WiFi in the customer premises equipment (CPE) devices.

In a CPE, virtual access points with control and routing function on at least one of layer 3 or above (referred to as "higher layer functionality" in the following) may be installed. The layering is according to the well known OSI layer model. In the OSI layer model, there are seven layers:

Layer 1: Physical layer
Layer 2: Data link layer
Layer 3: Network layer
Layer 4: Transport layer
Layer 5: Session layer
Layer 6: Presentation layer
Layer 7: Application layer.

In embodiments of the invention, the higher layer functionality is applied separately for the data streams of each of the virtual access points in the CPE. The configurations of the higher layer functionality may be independently adapted for each of the data streams to the virtual access points.

On the other hand, a logical channel of a physical transport means may be defined by a layer 2 functionality, such as virtual LAN (VLAN) or point-to-point over Ethernet (PPPoE).

Such a CPE may be used, e.g. by mobile network operators for offloading traffic of mobile subscribers over WiFi, whenever a subscriber is in the coverage area of a WiFi AP.

As most of the traffic in mobile networks is generated at homes, the likelihood of WiFi coverage is high, even when the subscriber does not have own WiFi. In denser areas it is quite likely that neighbours own WiFi, which may be leveraged.

Embodiments of the invention may comprise the following functions:

A virtual WiFi Access Point in the CPE unit in addition to the WiFi Access Point used by the site owner. Virtual Access Point is a WiFi deployment option, which installs a second AP entity in the same hardware by time-multiplexing the access to the WiFi radio interface between the main and the virtual AP function. Due to the huge bandwidth available in WiFi (up to 450 Mbit/s) in comparison with the speed of the subscriber line (less than 50 Mbit/s), the virtual AP does in practice not impair the WiFi performance of the main user.

A virtual access control and routing function in the CPE unit connected to the virtual AP, which establishes a second connection path back to the BRAS/core network for the control and traffic forwarding of the operator WiFi access network. The second connectivity path may be established over the access line by a second point-to-point over Ethernet (PPPoE) session or by a dedicated virtual local area network (VLAN) assignment. The primary user is fully separated from the secondary usage to ensure independence, integrity as well as security and privacy of the site owner. Access to the access control and routing function is limited to remote access by the operator to ensure the independence of the operator business despite making use of the same hardware.

A higher layer functionality of layer 3 or higher for each of the data paths of the virtual access points, such as—but not limited to—network address translation (NAT), firewalling, filtering, virtual private network (VPN) tunneling, and/or traffic shaping. The higher layer functionality may be configured for each of the data paths of the virtual access points separately and independently.

WiFi/Mobile operators which may be in a contractual relationship with DSL/Cable operators may install additional virtual access points with control and routing functions into the CPE units, which are fully separated from the access point and configuration of the site owner. This may be performed onsite of the CPE or by a remote firmware update of the deployed CPE devices.

The remote firmware update may be performed by a CPE wide area network (WAN) management protocol like TR-069. Connecting all the virtual APs into a common control and management system (e.g. TR-069 ACS for network configuration and monitoring; RADIUS AAA server for access control to the virtual WiFi access by subscribers) establishes an operator controlled access network without the need to install and deploy additional hardware for the radio access network (full reuse of the broadband access infrastructure for wireless operators), and without the need of onsite installation work.

Therefore, embodiments of the present invention may comprise a CPE WAN management system, which allows remote update of the firmware/software in the CPE device and provide sufficient management capabilities to remotely monitor and control the operation of the CPE unit including the higher layer functionality, e.g. based on TR-069. TR-069 allows the operator not only to remotely configure the CPE unit of the site owner, if desired and agreed by the site owner, but also enables a remote SW update of the CPE unit. By the remote SW update, the firmware of the CPEs may be replaced by a firmware comprising the virtual access point function, the virtual access control and routing function, and the higher layer functionality as described above. Such upgrade can be done at any time, even years after installation of the CPE unit (e.g. after the extension of a subscription, when customers agreeing with secondary usage of their equipment by the operator are getting some kind of benefit or reimbursement)

Embodiments of the present invention may further comprise an Authentication, Authorization, Accounting (AAA) server in the core network of the operator, which can be accessed by the virtual access control function in the CPE units over the second connectivity path for authentication and authorization of the access to the virtual WiFi AP, as well as for collection of usage data of the virtual WiFi AP for charging and billing purposes.

FIG. 1 shows a system employing an access apparatus 100*d* according to an embodiment of the invention. The access apparatus may be a CPE. It provides a single radio access for three radio networks. E.g. one of the radio networks may be the site owner's local WiFi network, another one related offloading LTE traffic to WiFi, a further one related to offloading GPRS traffic to WiFi. Alternatively, one of the radio networks may be a local WiFi network of another operator than the site owner. The number of radio networks, which corresponds to the number of virtual access points, is not limited to three but may be any number equal to or larger than two.

In the downlink direction, from a concentrator 500 such as a broadband remote access server (BRAS), traffic of the three radio networks is transmitted to the access apparatus 100*d* via three different logical channels 610*a*, 610*b*, and 610*c*, which are configured in a single physical transport means 600. The physical transport means may be wired such as LAN, WAN, ISDN, or wireless such as a microwave link. The logical channels may be channels of layer 2 and may be built e.g. by means of virtual LANs (VLAN) or point-to-point over Ethernet (PPPoE). The physical transport means must be capable of transporting different logical channels.

In the access apparatus 100*d*, the separator/aggregator 30 on the provider side separates the data streams of the different logical channels 610*a*, 610*b*, and 610*c* and forwards them to the respective processing means 20*a*, 20*b*, and 20*c*. In the processing means 20*a*, 20*b*, and 20*c*, a higher layer functionality such as network address translation, firewalling, filtering, virtual private network tunneling, and/or traffic shaping will be performed. For example, a network address (re-)translation may be performed for one of the data streams, and another network address (re-)translation may be performed for another data stream. It may be that a higher layer functionality is performed for some but not all of the different data streams.

The processing means 20*a*, 20*b*, and 20*c* may be individually configured. A configuration of one processing means does not influence the configuration of another of the processing means. Thus, the different owners of the radio access networks may configure higher layer functionality at the access point according to their individual needs.

From the processing means 20*a*, 20*b*, and 20*c*, the processed data streams (that is, data streams that have undergone the processing by the respective processing means) will be forwarded to the separator/aggregator 10 on the radio side, which aggregates the data streams into a single data stream and provides the single data stream to the radio interface.

In the uplink direction, from the radio interface, the data streams of the different radio networks are separated by the separator/aggregator 10 and forwarded to the respective processing means 20a, 20b, and 20c. After being processed in the respective processing means 20a, 20b, and 20c, the processed data streams are forwarded to the separator/aggregator 30. The separator/aggregator 30 forwards the different processed data streams into respective logical channels 610a, 610b, and 610c of the physical transport means 600.

FIGS. 2a to 2d show different embodiments of an access apparatus according to the present invention. Same numerals as in FIG. 1 designate corresponding functionalities, whereas small letters indicate variants of the corresponding functionalities.

FIG. 2a shows an embodiment of an access apparatus 100a, wherein the higher layer functionality is applied in the uplink path only. 11 denotes a separator on the radio side providing the separating function of the separator/aggregator 10 according to FIG. 1. 32 denotes an aggregator on the provider side providing the aggregating function of the separator/aggregator 30 according to FIG. 1.

FIG. 2b shows an embodiment of an access apparatus 100b, wherein the higher layer functionality is applied in the downlink path only. 31 denotes a separator on the provider side providing the separating function of the separator/aggregator 30 according to FIG. 1. 12 denotes an aggregator on the radio side providing the aggregating function of the separator/aggregator 10 according to FIG. 1. Some embodiments of the invention may comprise both an access apparatus 100a for the uplink path and an access apparatus 100b for the downlink path. Such an embodiment is shown as access apparatus 100c in FIG. 2c. The radio side separator 11 and aggregator 12 are connected to the same radio interface, and the provider side separator 31 and aggregator 32 are connected to the same physical transport means.

FIG. 2d shows an embodiment of an access apparatus 100d, wherein the higher layer functionality is applied to both the uplink and the downlink path. The access apparatus 100d corresponds to the access apparatus 100d shown in FIG. 2, wherein only two instead of three virtual access points are implemented. In the access apparatus 100d, separator 11 and aggregator 12 on the radio side according to FIG. 2c are integrated in the separator/aggregator 10, and separator 31 and aggregator 32 on the provider side are integrated in the separator/aggregator 30.

Figure 5A:
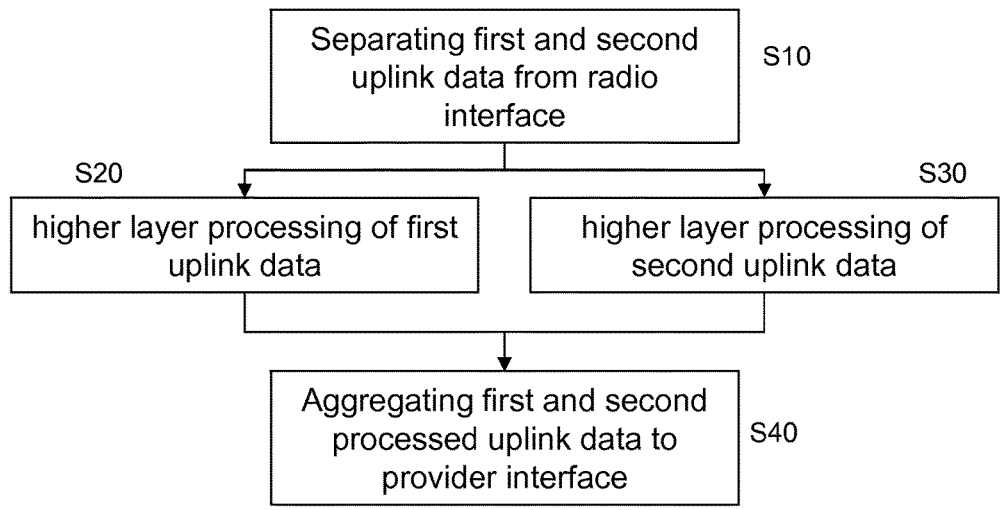
FIGS. 5a and 5b show methods according to embodiments of the invention.

FIG. 5a shows a method according to an embodiment of the invention that may be performed by an apparatus such as the access apparatus 100a.

In step S10, the first and second uplink data which are received from the radio interface for the first radio network and second radio network, respectively, are separated. These data are separately processed by a higher layer functionality in steps S20 and S30. In step S40, the processed data are aggregated into a physical transport means.

Figure 5B:
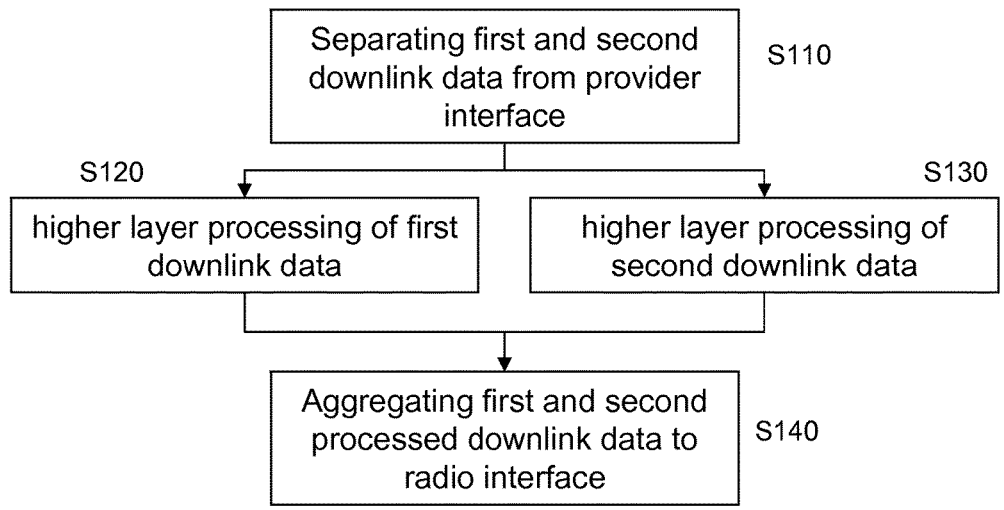

FIG. 5b shows a method according to an embodiment of the invention that may be performed by an apparatus such as the access apparatus 100b.

In step S110, the first and second uplink data which are received from a physical transport means for the first radio network and second radio network, respectively, are separated. These data are separately processed by a higher layer functionality in steps S120 and S130. In step S140, the processed data are aggregated into the radio interface.

In another method of the invention, both methods shown in FIGS. 5a and 5b are combined, wherein the radio interface, the physical transport means, and the logical channels are the same for both of these methods.

FIG. 3 shows a configuration manager according to an embodiment of the invention. The configuration manager comprises a storage means 50 such as a hard disk, random access memory (RAM), digital versatile disc (DVD) etc. The storage means stores configuration data of an access apparatus comprising at least two virtual access points.

Figure 6:
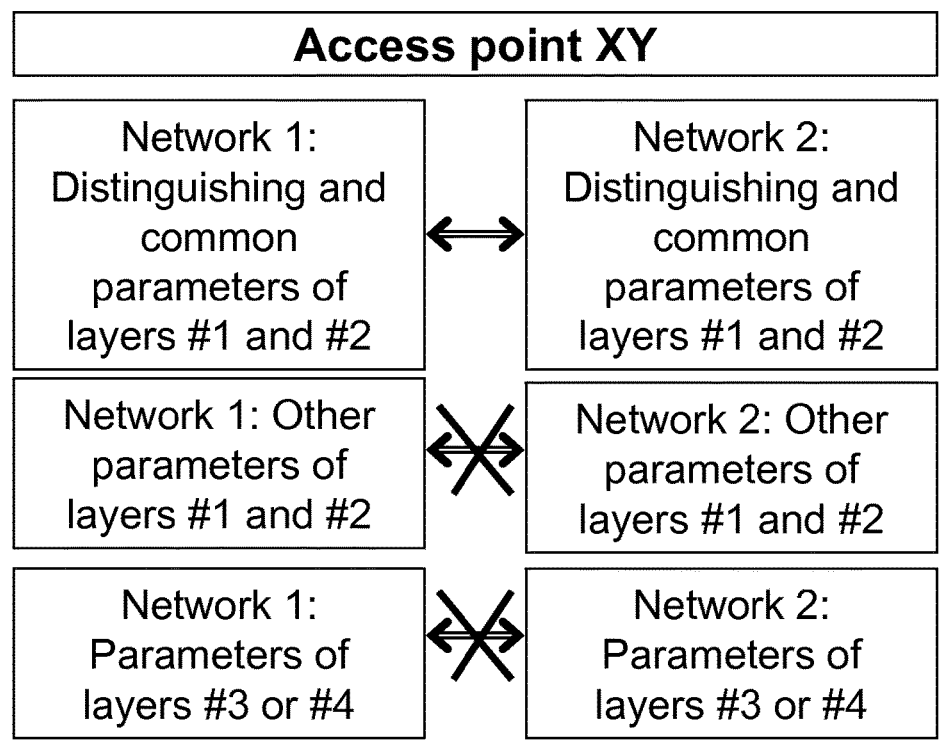
FIG. 6 shows a data model of a configuration manager according to an embodiment of the invention.

A data model of the stored configuration data is shown in FIG. 6. For each radio network, there are at least three different kinds of data:

parameters of layers 1 and 2 which are used to distinguish the data packets of the different virtual access points;
other parameters of layers 1 and 2; and
parameters of higher layer functionality.

In addition, the data model may comprise data that are common for all virtual access points (e.g. the site coordinates of the access point or the maximum allowed frequency band). These data may be stored for each of the virtual access points or separately from the configuration data of the individual virtual access points as common data.

The physical radio parameters of the first kind are related to the single radio interface of the access apparatus. For example, two virtual access points corresponding to two different radio networks may be distinguished in the radio interface by different service set identifiers (SSID). Then, it must be ensured that the SSIDs related to the different virtual access points are not the same. That is, the data of the first kind for one virtual access point are not independent from those of another virtual access point.

Alternatively, or in addition, the different virtual access points may be distinguished in the radio interface in that different blocks of a frequency spectrum allocated to the radio interface may be used, or that a different set of capabilities is provided at the radio interface. For example, one radio network may provide a robust secure network (RSN), while the other provides web portal access only. Still another example of first kind of data may be encryption keys that may be used to distinguish two virtual access points on the radio interface. In these cases, the frequency blocks, the capability set, and the encryption keys, respectively, belong to the first kind of data.

Other parameters of layer 1 and layer 2 may be differently and independently configured for each virtual access point. In an embodiment, the second kind of data may include all parameters of layers 1 and 2 that do not belong to the first kind of data.

The third kind of parameters (configuration data) is related to the higher layer. E.g. it comprises parameters used for network address translation, firewalling, filtering, virtual private network tunneling, and/or traffic shaping. The higher layer functionality applied to the data stream of one virtual access point does not depend on the same higher layer functionality applied to the data stream of another virtual access point. Thus, the parameters of the third kind of one virtual access point do not depend on the corresponding ones of another virtual access point.

FIG. 4 shows a configuration network which is a system according to an embodiment of the invention. The configuration network comprises an access point 100 which may be e.g. one of access apparatus 100a to 100d, and storage means 50 of a configuration manager. In addition, there is a communication means 110 related to the access apparatus 100, which is connected to a communication means 60 of the configuration manager. Through the communication means 60 and 110, the access apparatus and the configuration manager may exchange configuration data, e.g. based on TR-069 protocol. Thus, even if the configuration manager is remote from the access apparatus, the latter may be configured by the configuration manager without the need for onsite activities.

The access apparatus may be configured such that configuration data of one, some, or all virtual access points may be managed by the configuration manager. For example, the site owner may prefer local configuration of his related virtual access point, thus configuration of the corresponding virtual access point by the configuration manager is prohibited. Alternatively, the configuration manager may configure all virtual access points but only certain persons are authorized in the configuration manager to perform configurations on certain virtual access points.

Figure 7:
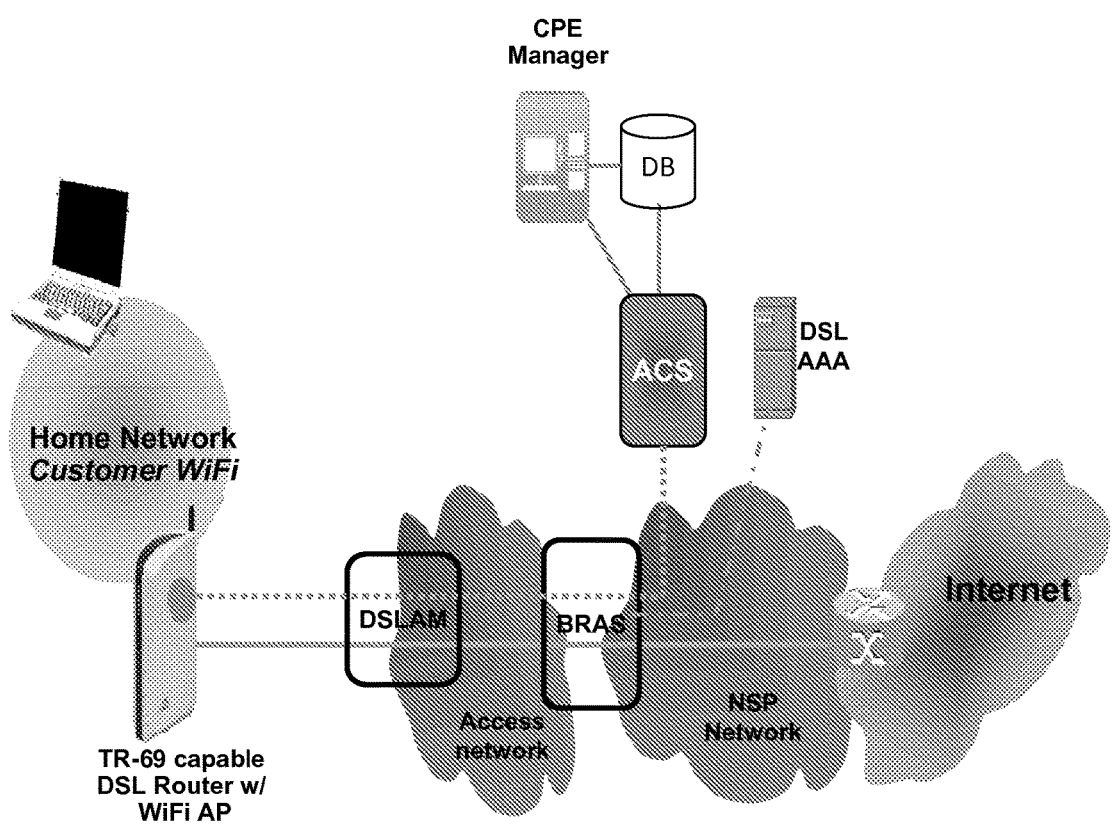
FIG. 7 shows a network configuration employing an access apparatus according to an embodiment of the invention.

FIG. 7 shows a broadband access architecture employing an access apparatus according to an embodiment of the invention.

Main elements of this architecture are:

BRAS: Broadband Remote Access Server, which acts as access router and access control and policy gateway for enabling user access to the Internet and services provided within the network service provider's (NSP) network. User sessions are established in the BRAS by use of PPPoE, or plain internet protocol over Ethernet (IPoE) transport and VLAN separation of traffic flows.

DSL AAA: DSL Authentication, Authorization and Accounting server, which provides user specific configuration information and verifies credentials, as well as collects the accounting information generated by the BRAS.

DSLAM: Digital Subscriber Line Access Multiplexer is the unit containing the line termination of the subscriber line and the aggregation function to split and combine user traffic from individual lines towards a high capacity transport infrastructure in the access network. Multiplexing in the access network may be based on VLAN enabled Ethernet technology or Multiprotocol Label Switching (MPLS).

CPE: Customer Premises Equipment; refers to a device providing virtual access points, in particular a TR-069-compliant device. The CPE is a device which contains the DSL modem, routing and filtering functions for forwarding user traffic as well as a WiFi access point for providing wireless connectivity to the DSL connectivity. It may also deploy a NAT function to allow multiple terminals to share a single access line. From a user perspective, access to the DSL connectivity is controlled by the security means of WiFi, while from operator perspective only a single subscription exists.

Remote configuration and management is done by usage of the TR-069 protocol suite. One particular functionality of the TR-069 protocol is the remote firmware update of the CPE, which opens the door for installing and providing new functions out of the CPE well after the physical installation of the CPE unit in the customer's home.

ACS: Automatic Configuration Server is the entity in the network of the DSL service provider, which terminates the TR-069 protocol for remote configuration and management of the CPE units. Usually the ACS is closely integrated with a data base system containing all the configuration information of the subscribers as well as with CPE Management system, which supports entering and modification of subscriber or device specific parameters and provides the console for the CPE specific customer relation management.

The DSL architecture supports more complex deployment scenarios with one operator just providing the access loop, while all traffic being forwarded to another service provider, which uses the rented access loop, provides services and interacts with the subscriber. Such scenarios may be based on a split BRAS functionality, with the local BRAS acting as Layer 2 Access Concentrator (LAC) and the BRAS in the service provider's network acting as Layer 2 Network Server (LNS). Resale may be widely deployed in the DSL networks, allowing e.g. mobile operators to provide DSL services without huge investments. Otherwise the DSL access architecture supports roaming of subscribers, which may also be used by an operator without own DSL infrastructure to make use of DSL for serving customers and off-loading cellular traffic, when DSL is available in the area.

To realize an access point with two virtual WiFi access points, the routing and forwarding functions of the AP (router) may be enhanced. Only the WiFi interface (radio interface) and the DSL Modem function closely depend of physical interfaces of the CPE and therefore these functions remain unique in a CPE.

Figure 8:
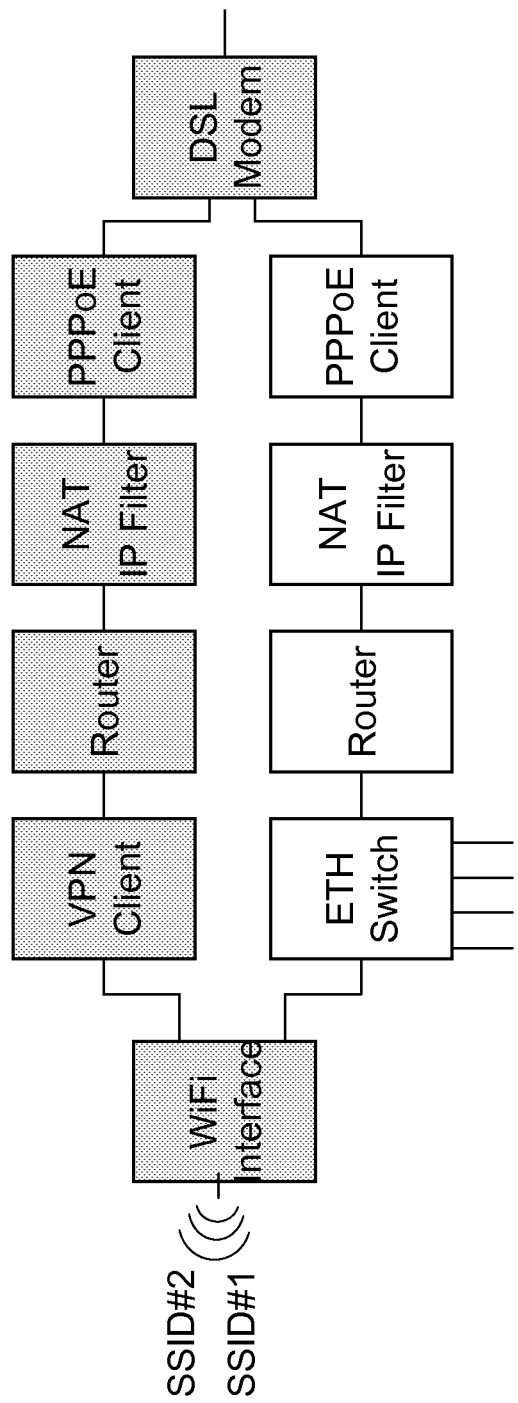
FIG. 8 shows an access apparatus according to an embodiment of the invention.

FIG. 8 shows the datapath and WiFi control functions of the CPE according to an embodiment of the invention supporting two virtual access points, such as a local WiFi of the site owner (private part) and a virtual WiFi related to a mobile network operator offloading part of its traffic to WiFi (operator part). While the white entities may reside on the private part, the grey entities may belong to the operator part and may be not configurable by the home user but only by the operator via a CPE WAN management protocol (CWMP) protocol such as TR-069.

Routing, network address translation (NAT), and IP filtering is performed separately for each data path. The configurations of these functionalities of one data path may be completely independent from the other data path.

The VPN Client in the data path of the operator WiFi may be used for enabling secured access to mobile networks.

The Ethernet (ETH) switch in the private part allows connection of a wired LAN.

The PPPoE clients in each data path terminate a respective logical channel on the DSL line. The other termination is typically in the BRAS.

In the embodiment shown in FIG. 8, the WiFi (radio) interface and the DSL modem belong to the network operator. In other embodiments, these entities may belong to the site owner, or one may belong to the site owner and the other to the network operator. In some embodiments, two owners may have authorization to configure these entities. However, at least some of the parameters, which are used to distinguish the data streams of the two different virtual access points on the radio interface, should usually be managed by only one owner in order to avoid a potential conflict, if required dependencies of these parameters are violated.

If not otherwise stated or otherwise made clear from the context, the statement that two entities are different means that they are differently addressed in the communication network. It does not necessarily mean that they are based on different hardware. That is, each of the entities described in the present description may be based on a different hardware, or some or all of the entities may be based on the same hardware.

Some embodiments are described with respect to a WiFi radio access hereinabove. However, embodiments of the invention are not limited to WiFi radio access, and may be implemented using other radio access techniques such as global system for communication (GSM), universal mobile telecommunication system (UMTS), long term evolution (LTE) system, etc.

Some embodiments are described with respect to a DSL subscriber line. However, embodiments of the invention are not limited to the DSL subscriber line, and may be implemented by any physical transport means that allows for different logical channels, such as Ethernet, ATM, ISDN, PDH, SDH, and also wireless connections such as microwave connections or global packet radio system (GPRS) connections.

Different radio networks may be distinguished e.g. by their technology, the allocated frequency spectrum, and/or their identifier such as country code (CC), national destination code (NDC) etc.

According to the above description, it should thus be apparent that exemplary embodiments of the present invention provide, for example an access point function such as a CPE, or a component thereof, an apparatus embodying the same, a method for controlling and/or operating the same, and computer program(s) controlling and/or operating the same as well as mediums carrying such computer program(s) and forming computer program product(s). Further exemplary embodiments of the present invention provide, for example a configuration management function such as a configuration manager, or a component thereof, an apparatus embodying the same, a method for controlling and/or operating the same, and computer program(s) controlling and/or operating the same as well as mediums carrying such computer program(s) and forming computer program product(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
   at least one memory comprising computer program code;
   at least one processor;
   wherein the at least one memory and the computer program code are configured, with the at least one processor, to cause the apparatus at least to:
   separate at a radio side first uplink data of a first radio network received from a single physical radio interface from second uplink data of a second radio network received from the single physical radio interface;
   process, according to a first layer 3 or higher layer uplink functionality, the first uplink data into first processed uplink data;
   process, according to a second layer 3 or higher layer uplink functionality, the second uplink data into second processed uplink data; and
   aggregate at a provider side the first processed uplink data to a first logical channel of a physical transport means and the second processed uplink data to a second logical channel of the physical transport means, wherein
   the first radio network provides a first type of service and second radio network provides a second type of service that is different than the first type of service;
   the first layer 3 or higher layer uplink functionality does not influence the second layer 3 or higher layer uplink functionality; and
   the first logical channel is different from the second logical channel.

2. An apparatus, comprising:
   at least one memory comprising computer program code;
   at least one processor;
   wherein the at least one memory and the computer program code are configured, with the at least one processor, to cause the apparatus at least to:
   separate at a provider side first downlink data for a first radio network received from a first logical channel of a physical transport means from second downlink data for a second radio network received from a second logical channel of the physical transport means;
   process, according to a first layer 3 or higher layer downlink functionality, the first downlink data into first processed downlink data;
   process, according to a second layer 3 or higher layer downlink functionality, the second downlink data into second processed downlink data; and
   aggregate at a radio side the first processed downlink data and the second processed downlink data to a single physical radio interface, wherein
   the first radio network provides a first type of service and the second radio network provides a second type of service that is different than the first type of service;
   the first layer 3 or higher layer uplink functionality does not influence the second layer 3 or higher layer uplink functionality; and
   the first logical channel is different from the second logical channel.

3. The apparatus according to claim 1, wherein the at least one memory and the computer program code are configured, with the at least one processor, to further cause the apparatus at least to:
   separate at a provider side first downlink data for the first radio network received from the first logical channel from second downlink data for the second radio network received from the second logical channel;
   process, according to the first layer 3 or higher layer downlink functionality, the first downlink data into first processed downlink data;
   process, according to the second layer 3 or higher layer downlink functionality, the second downlink data into second processed downlink data; and
   aggregate at a radio side the first processed downlink data and the second processed downlink data to the single physical radio interface.

4. The apparatus according to claim 1, wherein at least one of the first layer 3 or higher layer uplink functionality and the second layer 3 or higher layer downlink functionality is network address translation, firewalling, filtering, virtual private network tunneling, or traffic shaping.

5. The apparatus according to claim 1, wherein,
   the process of the first uplink is configurable independent from the process of the second uplink.

6. The apparatus according to claim 1, wherein the at least one memory and the computer program code are configured, with the at least one processor, to further cause the apparatus at least to:
   communicate at least one of a first processing parameter and a second processing parameter with a configuration device; wherein,
   process the first uplink data and the second uplink data based on the first and second processing parameter, respectively.

7. A customer premises equipment comprising an apparatus according to claim 1.

8. A non-transitory computer-readable medium encoding instructions that, when executed in hardware, perform a process, the process comprising:
- storing configuration information in a storage medium, wherein the configuration information comprises:
- a first parameter of an access apparatus, wherein the first parameter is a physical radio access parameter of a physical radio access of the access apparatus for a first radio network,
- a second parameter of the access apparatus for a second radio network, wherein the second parameter corresponds to the first parameter,
- a third parameter of the access apparatus of a layer 1 or layer 2 functionality of the first radio network,
- a fourth parameter of the access apparatus of the layer 1 or layer 2 functionality of the second radio network,
- a fifth parameter of the access apparatus of a first layer 3 or higher layer functionality of the first radio network, and
- a sixth parameter of the access apparatus of a second layer 3 or higher layer functionality of the second radio network,
- wherein the first radio network provides a first type of service and the second radio network provides a second type of service that is different than the first type of service;
- determining a value of the first parameter depending on a value of the second parameter,
- determining a value of the third parameter independently of a value of the fourth parameter,
- wherein the first layer 3 or higher layer uplink functionality does not influence the second layer 3 or higher layer functionality; and
- aggregating at least one of the first parameter, the second parameter, the third parameter, the fourth parameter, the fifth parameter, or the sixth parameter at a logical channel.

9. A non-transitory computer-readable medium encoding instructions that, when executed in hardware, perform a process, according to claim 8, wherein the layer 3 or higher layer functionality are network address translation, firewalling, filtering, virtual private network tunneling, or traffic shaping.

10. A non-transitory computer-readable medium encoding instructions that, when executed in hardware, perform a process, according to claim 8, storing more than one fifth parameter for the first radio network and corresponding sixth parameters for the second radio network, wherein a value of each of the fifth parameters does not depend on a value of the corresponding sixth parameter.

11. A non-transitory computer-readable medium encoding instructions that, when executed in hardware, perform a process, according to claim 8, wherein a configuration manager is utilized.

12. A system, comprising:
- an access apparatus comprising:
- at least one memory comprising computer program code;
- at least one processor;
- wherein the at least one memory and the computer program code are configured, with the at least one processor, to cause the apparatus at least to:
- separate at the radio side first uplink data of a first radio network received from a single physical radio interface from second uplink data of a second radio network received from the single physical radio interface;
- process, according to a first layer 3 or higher layer uplink functionality, the first uplink data into first processed uplink data;
- process, according to a second layer 3 or higher layer uplink functionality, the second uplink data into second processed uplink data; and
- aggregate at a provider side the first processed uplink data to a first logical channel of a physical transport and the second processed uplink data to a second logical channel of the physical transport, wherein the first radio network provides a first type of service and the second radio network provides a second type of services that is different than the first type of service, the first layer 3 or higher layer uplink functionality does not influence the second layer 3 or higher layer uplink functionality, and the first logical channel is different from the second logical channel;
- communicate at least one of a first processing parameter and a second processing parameter with a configuration device; wherein,
- the process of the first and second uplink data is based on the first and second processing parameter, respectively;
- said system further comprising:
- a configuration apparatus comprising:
- storage medium configured to store a configuration information; wherein the configuration information comprises
- a first parameter of the access apparatus, wherein the first parameter is a physical radio access parameter of a physical radio access of the access apparatus for a first radio network,
- a second parameter of the access apparatus for a second radio network, wherein the second parameter corresponds to the first parameter,
- a third parameter of the access apparatus of a layer 1 or layer 2 functionality of the first radio network;
- a fourth parameter of the access apparatus of the layer 1 or layer 2 functionality of the second radio network;
- a fifth parameter of the access apparatus of the first layer 3 or higher layer functionality of the first radio network; and
- a sixth parameter of the access apparatus of the second layer 3 or higher layer functionality of the second radio network; wherein
- a value of the first parameter depends on a value of the second parameter;
- a value of the third parameter does not depend on a value of the fourth parameter; and
- the first layer 3 or higher layer uplink functionality is independent of the second layer 3 or higher layer uplink functionality,
- wherein the configuration apparatus further comprises the process of exchanging at least one of the fifth and sixth parameters with the access apparatus,
- the fifth parameter of the configuration apparatus corresponds to the first processing parameter, and wherein
- the sixth parameter of the configuration apparatus corresponds to the second processing parameter.

13. A method, comprising:
- separating first uplink data of a first radio network received from a single physical radio interface from second uplink data of a second radio network received from the single physical radio interface;
- processing, according to a first layer 3 or higher layer uplink functionality, the first uplink data into first processed uplink data;

processing, according to a second layer 3 or higher layer uplink functionality, the second uplink data into second processed uplink data; and providing through aggregation the first processed uplink data to a first logical channel of a physical transport and the second processed uplink data to a second logical channel of the physical transport, wherein the first radio network provides a first type of service and the second radio network provides a second type of service that is different than the first type of service;

the first layer 3 or higher layer uplink functionality does not influence the second layer 3 or higher layer uplink functionality; and the first logical channel is different from the second logical channel.

14. A method, comprising:

separating first downlink data for a first radio network received from a first logical channel of a single physical transport from second downlink data for a second radio network received from a second logical channel of the single physical transport;

processing, according to a first layer 3 or higher layer downlink functionality, the first downlink data into first processed downlink data;

processing, according to a second layer 3 or higher layer downlink functionality, the second downlink data into second processed downlink data; and aggregating the first processed downlink data and the second processed downlink data to a single physical radio interface, wherein the first radio network provides a first type of service and the second radio network provides a second type of service that is different than the first type of service;

the first layer 3 or higher layer uplink functionality does not influence the second layer 3 or higher layer uplink functionality; and the first logical channel is different from the second logical channel.

15. The method according to claim 13, further comprising:

separating first downlink data for the first radio network received from the first logical channel from second downlink data for the second radio network received from the second logical channel;

processing, according to the first layer 3 or higher layer downlink functionality, the first downlink data into first processed downlink data;

processing, according to the second layer 3 or higher layer downlink functionality, the second downlink data into second processed downlink data; and aggregating the first processed downlink data and the second processed downlink data to the single physical radio interface.

16. The method according to claim 13, wherein at least one of the layer 3 or higher layer uplink functionality and the layer 3 or higher layer downlink functionality is network address translation, firewalling, filtering, virtual private network tunneling, or traffic shaping.

17. The method according to claim 13, wherein, the processing of the first uplink data is configurable independent from the processing of the second uplink data.

18. The method according to claim 13, further comprising:

communicating a first and second processing parameter with a configuration device; wherein, the processing of the first uplink data and the second uplink data is based on the first and second processing parameter, respectively.

19. A method, comprising:

storing a configuration information; wherein the configuration information comprises:

a first parameter of an access apparatus, wherein the first parameter is a physical radio access parameter of a physical radio access of the access apparatus for a first radio network, a second parameter of the access apparatus for a second radio network, wherein the second parameter corresponds to the first parameter, a third parameter of the access apparatus of a layer 1 or layer 2 functionality of the first radio network;

a fourth parameter of the access apparatus of the layer 1 or layer 2 functionality of the second radio network;

a fifth parameter of the access apparatus of a first layer 3 or higher layer functionality of the first radio network; and a sixth parameter of the access apparatus of a second layer 3 or higher layer functionality of the second radio network; wherein the first radio network provides a first type of service and the second radio network provides a second type of service that is different than the first type of service;

a value of the first parameter depends on a value of the second parameter;

a value of the third parameter does not depend on a value of the fourth parameter; and the first layer 3 or higher layer uplink functionality does not influence the second layer 3 or higher layer uplink functionality.

20. The method according to claim 19, wherein the layer 3 or higher layer functionality are network address translation, firewalling, filtering, virtual private network tunneling, or traffic shaping.

21. The method according to claim 19, wherein the storing comprises storing more than one fifth parameter for the first radio network and corresponding sixth parameters for the second radio network, wherein a value of each of the fifth parameters does not depend on a value of the corresponding sixth parameter.

22. Computer program product comprising computer-executable components which perform, when the program is run on a computer, the execution which results in operations of the method according to claim 13.

23. The computer program product according to claim 22, embodied as a computer-readable storage medium.

24. The apparatus according to claim 2, further comprising:

communicator configured to communicate at least one of a first processing parameter and a second processing parameter with a configuration device, wherein the first and second downlink processors are configured to process based on the first and second processing parameter, respectively.

25. The method according to claim 14, wherein the processing of the first downlink data is configurable independent from the processing of the second downlink data.

26. The method according to claim 14, further comprising:

communicating a first and second processing parameter with a configuration device, wherein the processing of the first downlink data and the second downlink data is based on the first and second processing parameter, respectively.

27. The apparatus according to claim 1, wherein the first service provides a wireless local area network and the second service offloads mobile communications traffic to a wireless local area network.

28. The apparatus according to claim 1, wherein the first radio network is owned by a first owner and the second radio network is owed by a second owner that is different than the first owner.

29. The apparatus according to claim 1, wherein the first radio network is distinguished in the single physical radio interface by a first service set identifier (SSID) and the second radio network is distinguished in the single physical radio interface by a second SSID that is different than the first SSID.

* * * * *